Sept. 28, 1965 H. FRENK 3,209,153

ARRANGEMENT FOR COMPENSATING DARK CURRENT IN PHOTOELECTRIC DEVICES

Filed July 5, 1961

INVENTOR

BY

United States Patent Office 3,209,153
Patented Sept. 28, 1965

3,209,153
ARRANGEMENT FOR COMPENSATING DARK CURRENT IN PHOTOELECTRIC DEVICES

Helmuth Frenk, Wetzlar (Lahn), Germany, assignor to Ernst Leitz Gesellschaft mit beschrankter Haftung, Wetzlar (Lahn), Germany Filed July 5, 1961, Ser. No. 121,950
Claims priority, application Germany, July 15, 1960, L 36,591
5 Claims. (Cl. 250—207)

The present invention relates to photoelectric circuits, more particularly, to an arrangement for compensating the dark current flowing from a photoelectric cell.

Photoelectric circuits have been employed in automatic exposure arrangements such as used in cameras and enlargers. In one form of the circuit a capacitor is interconnected between the anode of a photomultiplier tube and the cathode of a gas-filled cold cathode thyratron tube. This capacitor is charged during the time in which the firing voltage of the tube is impressed upon the thyratron tube. Firing of the tube will energize a relay which is so connected to the exposure mechanism so as to terminate the exposure system.

The firing of the thyratron tube can also be obtained by the use of small capacitances so that extremely small photoelectric currents, caused by a very small quantity of light impinging upon the photoelectric cell, will be utilized.

It is known, however, that even when no light impinges on the photoelectric cell, a current still flows therefrom. This current is commonly referred to as a dark current. It is apparent that when very small photoelectric currents are produced by the photoelectric cell, the presence of the dark current is highly objectionable since the period of time for firing the relay valve cannot be accurately established. In addition, even though no light is impinging on the photoelectric cell, the dark current will continue to flow and this dark current will eventually charge the capacitor sufficiently so as to bring about a firing of the relay valve. This finite period of time during which charging of the condenser continues even though the photoelectric cell is dark, comprises the maximum obtainable exposure time for the camera.

It is desired that the exposure time be infinite when the photoelectric cell is dark. One proposal for achieving an infinite period of time in complete darkness comprised connecting a variable resistance in parallel with the capacitance. As a result, the circuit would lose its sensitivity when low photoelectric currents are used and therefore there would be no charging of the capacitor until the firing point of the thyratron tube was reached. In practice, however, a variable resistance having a magnitude of about $10^8$ ohms would be required and this type of resistor can be obtained only as an expensive custom-built component.

It is therefore the principal object of this invention to provide a novel and improved arrangement for compensating for dark current in the integrators of photoelectric current.

In the present invention the circuit comprises the capacitor connected between a photomultiplier tube and a thyratron tube as described previously. In addition, however, an RC-circuit is provided to connect the capacitor with a positive potential which is high compared with the charging potential of the capacitor. There is a periodically actuated control switch in the RC-circuit. The switch is controlled in accordance with the desired charging purpose and the rate of the actuating of the switch may be readily obtained by using a mechanically actuated system.

In a modification of this invention the control of the

RC-circuit is achieved by the use of an additional thyratron tube whose firing point is established by an electrical resistance connected in a second RC-circuit.

The arrangement of the present invention differs from other known arrangements in that it is very effective although employing a simple construction. In practice, exposure of virtually any duration can be obtained even when relatively insensitive film materials are being exposed.

Other objects and advantages of this invention will be apparent upon reference to the accompanying description when taken in conjunction with the following drawings, wherein.

Figure 1:
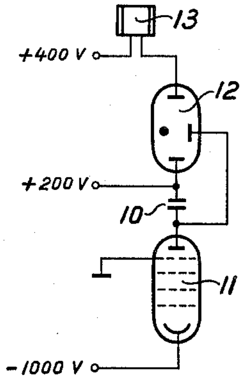
Fig. 1 PRIOR ART
FIGURE 1 is a schematic electrical diagram of a known circuit used with an automatic exposure arrangement.

Returning now to the drawings wherein like reference symbols indicate the same parts throughout the various views, particularly to FIGURE 1, the circuit illustrated therein comprises a capacitor 10 which is connected between the anode of a photomultipler tube 11 and the cathode of a gas-filled cold cathode thyratron tube 12. A relay 13 is energized by firing of the tube 12. The relay 13 is connected to the exposure apparatus so as to terminate the exposure process when it is energized upon firing of the tube.

Figure 2:
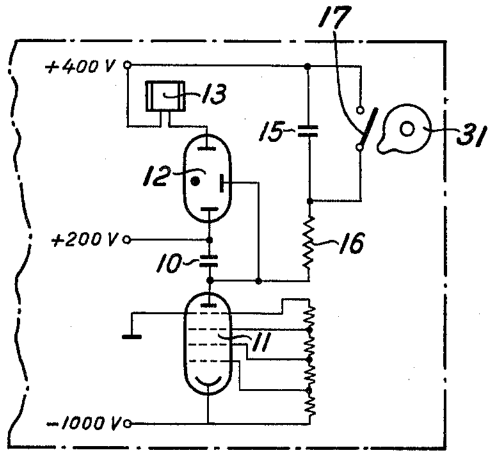
FIGURE 2 is a schematic electrical diagram of the arrangement of the present invention.

In FIGURE 2 there is illustrated the invention as applied to the circuit shown in FIGURE 1. In FIGURE 2 an RC-circuit comprising a capacitor 15 and a resistance 16 connects the capacitor 10 with a positive potential of 400 volts. This positive potential is high as compared with the charging potential of the capacitor 10. A periodically actuated control switch 17 is connected across the capacitor 15.

Other forms of voltage level sensitive switching devices can be employed instead of the thyratron tube 12. By way of example, tubes or electrostatic measuring arrangements can be employed.

A switch 17 is connected to an operating device 31 so as to intermittently open and close the switch. Such devices are shown in FIG. 2 of U.S. Patent 2,775,758 and in U.S. Patent 1,909,471. Obviously, other equivalent forms of operating devices can be employed.

With respect to the operation of the circuit of this invention when the switch 17 is closed, the capacitor 15 will be discharged so that the energy necessary to charge the capacitor 15 is taken from the capacitor 10 when the switch is open. This provides a drawing-off of the dark current and accordingly the dark currents are prevented from building up a charge which would reach the firing point of the arrangement used. Low photoelectric currents can be used to obtain the firing point.

The capacitor 10 functions as a charging capacitor and the capacitor 15 as a discharging capacitor. Therefore, the capacitance of the capacitor 15 is small as compared with the capacitance of the capacitor 10. The capacitance of capacitor 15 is less than one-third of the capacitance of capacitor 10.

Figure 3:
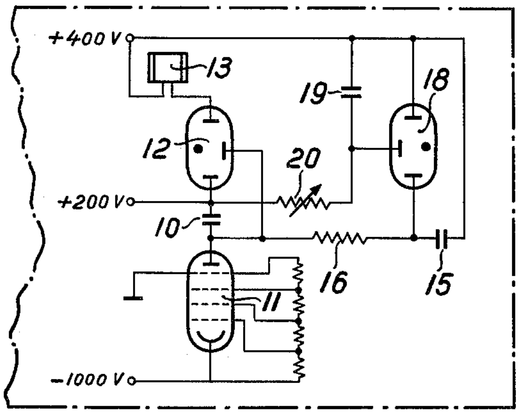
FIGURE 3 is a schematic electrical diagram of a modification of the circuit of the present invention and comprising an automatic control element.

Proceeding next to FIGURE 3 there is shown a modification of the invention of FIGURE 2 wherein a relay valve is employed instead of the switch used in FIGURE 2. In FIGURE 3 a cold cathode thyratron tube 18 is connected across the capacitor 15. A second RC-circuit comprising a capacitor 19 and a variable resistance 20 is also connected across the RC-circuit 15 and 16.

In the operation of this arrangement the RC-circuit 19, 20 periodically fires the tube 18, so that the tube 18, a voltage level sensitive switching device, performs the same function as the periodically actuated switch 17.

Thus it can be seen that the circuit arrangements of this invention as illustrated in FIGURES 2 and 3 completely compensate for the dark current flowing from the photoelectric cell. As a result, the difficulties and disadvantages of prior known arrangements are eliminated.

The present invention can also be used to compensate for the Schwarzschild effect. The Schwarzschild effect relates to the sensitivity of films when using extremely short or extremely long exposure times. While most films are uniformly sensitive within a limited range to the product of light intensity and time, this is no longer true when extremely short or extremely long exposure times are employed.

The Schwarzschild index balances the varying reaction of the film material due to the extremely short or extremely long exposure times.

It will be understood that this invention is susceptible to modification in order to adapt it to different usages and conditions and, accordingly, it is desired to comprehend such modifications within this invention as may fall within the scope of the appended claims.

What is claimed as this invention is:

1. An arrangement for compensating for dark current in an integrator for photoelectric current and comprising a photomultiplier tube, a voltage level sensitive switching device connected to said tube, a charging capacitor connected in series between the anode of said tube and said voltage level sensitive switching device, and an RC-circuit connecting said capacitor with a positive potential which is high with respect to the charging potential of said capacitor.

2. An arrangement for compensating for dark current in an integrator for photoelectric current and comprising a photomultiplier tube, a voltage level sensitive switching device connected to said tube, a charging capacitor connected in series between the anode of said tube and said voltage level sensitive switching device, and an RC-circuit connecting said capacitor with a positive potential which is high with respect to the charging potential of said capacitor, and a switch connected across a portion of said RC-circuit for partially short-circuiting the circuit.

3. An arrangement for compensating for dark current in an integrator for photoelectric current and comprising a photomultiplier tube, a voltage level sensitive switching device connected to said tube, a charging capacitor connected in series between the anode of said tube and said voltage level sensitive switching device, an RC-circuit connecting said capacitor with a positive potential which is high with respect to the charging potential of said capacitor, a switch connected across a portion of said RC-circuit for partially short-circuiting the circuit, and means for periodically actuating said switch at a predetermined rate.

4. An arrangement for compensating for dark current in an integrator for photoelectric current and comprising a photomultiplier tube, a first voltage level sensitive switching device connected to said tube, a charging capacitor connected in series between the anode of said tube and said first voltage level sensitive switching device, an RC-circuit connecting said capacitor with a positive potential which is high with respect to the charging potential of said capacitor, a second voltage level sensitive switching device connected across a portion of said RC-circuit for periodically partially short-circuiting said circuit, and a second RC-circuit connected across said second voltage level sensitive switching device for determining the periodic actuation thereof.

5. An arrangement for compensating for dark current in an integrator for photoelectric current and comprising a photomultiplier tube, a gas-filled relay tube having its cathode connected to the anode of said photomultiplier tube, a charging capacitor connected between said photomultiplier tube and said relay tube, and an RC-circuit connecting said capacitor with a positive potential which is high with respect to the charging potential of said capacitor.

References Cited by the Examiner

UNITED STATES PATENTS

| | | | |
|---|---|---|---|
| 2,647,436 | 8/53 | Shapiro | 250—207 X |
| 2,728,863 | 12/55 | Goodyear | 250—207 |
| 2,743,374 | 4/56 | McCreary | 250—214 |
| 2,750,518 | 6/56 | Fahrner et al. | 250—207 X |

FOREIGN PATENTS

| | | |
|---|---|---|
| 682,688 | 11/52 | Great Britain. |

RALPH G. NILSON, *Primary Examiner.*

WALTER STOLWEIN, *Examiner.*